2,867,713

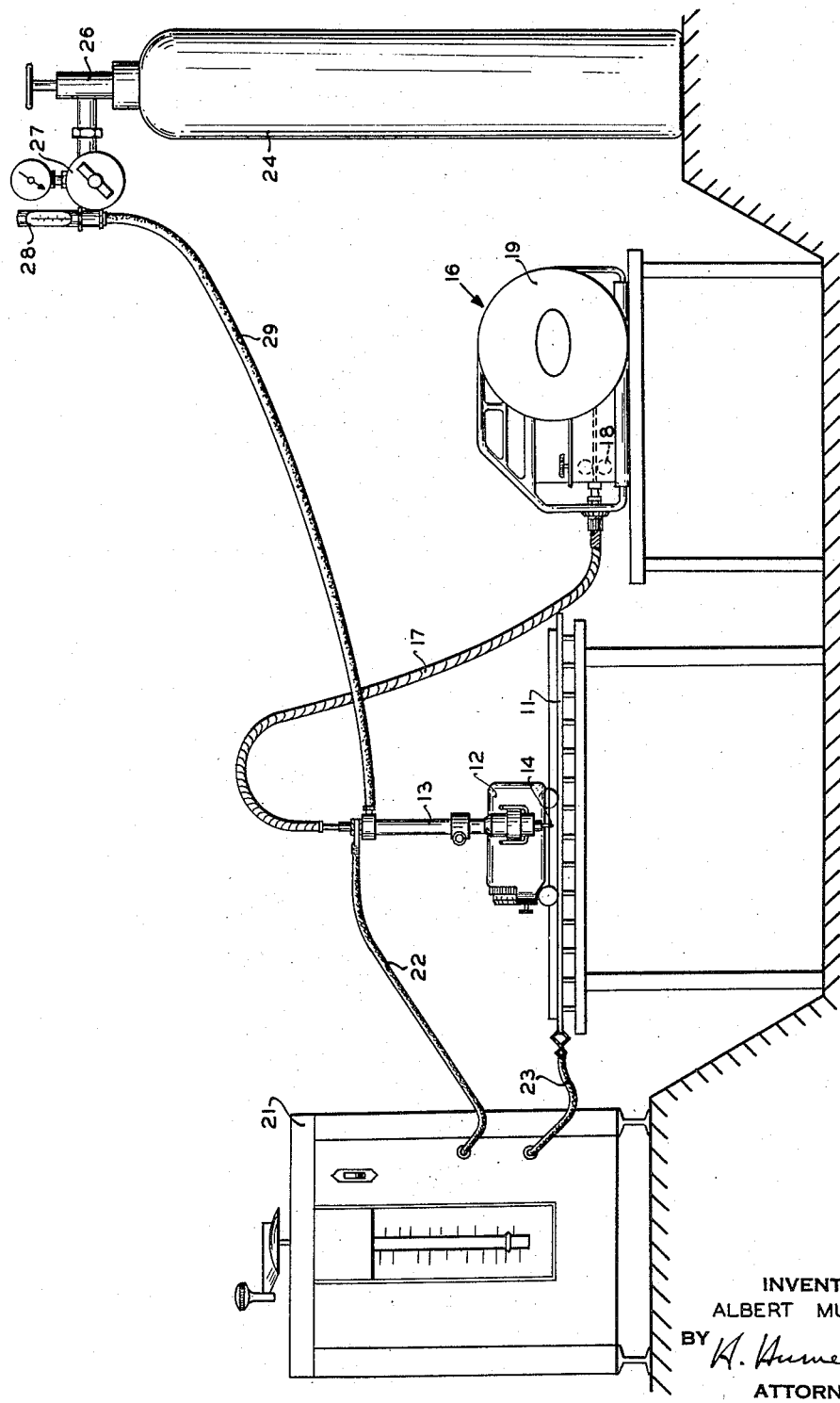

GAS SHIELDED ARC CUTTING

Albert Muller, Watchung, N. J., assignor to Air Reduction Company, Incorporated, New York, N. Y., a corporation of New York Application November 15, 1954, Serial No. 468,646

5 Claims. (Cl. 219—69)

This application is a continuation-in-part of my co-pending application Serial No. 288,447 now Patent No. 2,694,763, and my co-pending application Serial No. 288,448, now Patent No. 2,694,764, both filed May 17, 1952 and assigned to the assignee of the present invention.

The present invention relates to gas shielded arc cutting, and more particularly to improvements in electric arc cutting in an atmosphere of monatomic inert gas as disclosed in an article entitled "Electric Arc Cutting of Aluminum" starting on page 88 of the March 1953 issue of the publication "Welding and Metal Fabrication." Another article entitled "Use of Gas Shielded Arc Processes for Cutting Non-ferrous Metals" starting on page 188 of the May 1954 issue of the same publication, deals further with this same subject. Briefly, the process described in these publications comprises maintaining a high current density arc between a consuming wire electrode (preferably ferrous) and a workpiece (preferably non-ferrous) to be cut. A flowing stream of inert gas is supplied around the end of the electrode to shield the electrode, the arc, and the portion of the workpiece being cut, from the ambient atmosphere. If the appropriate high current density and high wire feed rate are provided, a cut will be produced in the workpiece when there is relative motion between the wire and the workpiece in a direction parallel to the surface of the workpiece. Under the proper operating conditions, the end of the electrode is buried in the kerf and the molten metal from the end of the electrode is projected from the bottom of the kerf free of the workpiece. When this process is used with direct current reverse polarity metal is projected from the end of the electrode in a stream of fine discrete droplets axially to the wire, and there is substantial freedom from arc instability, short circuiting, and contamination of the workpiece by molten electrode metal. Direct current straight polarity has not heretofore been entirely satisfactory for a cutting process of this type because of the high burn-off rate of the electrode wire and the relatively low heat evolved at the plate. Since the cost of the electrode wire melted is a substantial part of the total cost of the process, it is desirable to burn off as little wire as possible. In addition, the metal transfer characteristics in straight polarity are such that large and mis-directed globules of molten metal leave the end of the electrode wire and cause short circuiting, arc instability, and contamination of the workpiece being cut. It is suggested in one of the articles referred to above that alternating current can be used if high frequency stabilization of the arc is provided. While the arc can be maintained in this manner, the cutting process has not been entirely satisfactory because of the poor metal transfer characteristic. It is essential to satisfactory operation of this cutting process that projected metal spray type transfer be achieved, and this has been done heretofore by the use of direct current reverse polarity. However, since this cutting process is inherently a high current process, it would be extremely advantageous to be able to achieve the desired results with the use of an alternating current power supply since a high current transformer is much less costly and much simpler than a high current direct current source of power.

It is an object therefore, of the present invention to provide an improved inert gas shielded arc cutting process.

Another object is to provide an inert gas shielded arc cutting method employing an alternating current power supply.

Another object is to provide an inert gas shielded arc cutting method employing a direct current power supply at straight polarity.

These and other objects and advantages of the invention will be pointed out or will become apparent from the following detailed description.

According to the present invention, the principles of composite surface emission in an inert atmosphere disclosed in detail in my co-pending applications Serial Nos. 288,447 and 288,448 filed May 17, 1952 are applied to the inert gas shielded arc cutting process to provide fast, high quality cutting with an alternating current power supply or with straight polarity direct current. In general such composite surface emission is produced by supplying to the inert gas shielded arc a substance comprising a metal selected from the group consisting of alkali metals, the alkaline earth metals, lanthanum and the lanthanum series rare earth metals, actinium and the actinium series rare earth metals, scandium, and yttrium.

The single figure of the drawing illustrates generally the necessary apparatus to carry out the cutting process of the present invention. The plate to be cut is designated 11. The motorized carriage 12 supports a cutting head 13 in operable relation to the workpiece 11 to be cut. The cutting head 13 consists generally of a barrel surrounding a wire guide and contact. The electrode wire 14 is fed to the cutting head 13 from a wire feeder 16 through flexible conduit 17. Electric motor driven nip rolls 18 in the wire feeder 16 withdraw the wire from a reel 19 and push it through the casing 17 to the cutting head 13. Arc current is supplied to the wire and workpiece from a welding machine 21 through conductors 22 and 23 connected to the cutting head and workpiece respectively. Conductors within the cutting head 13 carry the arc current from the terminal at the top of the cutting head to which conductor 22 is attached to a contact tube within the cuting head near the arc. As the electrode wire is passed through the cutting head 13, the arc current is introduced into the wire from the contact tube. The outer barrel of the cutting head 13 terminates in a nozzle surrounding the contact tube and the end of the electrode forming a gas passage through which inert gas is fed to shield the arc. This gas, preferably argon, is supplied from a compressed gas cylinder 24, having the usual cylinder valve 26, pressure regulator 27 and flowmeter 28. A flexible tube 29 conducts the gas from the cylinder to the gas inlet on the cutting head 13. The apparatus required for this process which is described briefly above may be identical to the appaartus used for inert gas shielded consuming electrode metal arc welding. This apparatus may be of the manual or machine type. Such apparatus is now well known in the art.

The operation of this apparatus, as used for arc cutting, is as follows. The gas flow is adjusted by regulator 27 to provide an arc protecting flow of monatomic inert gas from the discharge nozzle of cutting head 13. An arc established between the electrode and the workpiece is maintained by feeding the wire to the work at a rate equal to the burn-off rate of the wire in the arc. By providing sufficiently high current density and sufficiently high wire feed speed the end of the electrode can be maintained in the kerf in such a manner that the molten metal projected from the end of the electrode will fall clear of the kerf and the electric arc circuit will be completed from the wire to the workpiece. Under these conditions, the cut progresses as the cutting head 13 is moved relative to the work in a direction parallel to the surface of the work by the motorized carriage 12. The cutting action is greatly facilitated by proper selection of electrode metal relative to workpiece metal. For example a ferrous base electrode gives good results in the cutting of copper or aluminum base workpiece materials.

In my co-pending applications Serial Nos. 288,447 and 288,488 filed May 17, 1952, and referred to above, there is disclosed in detail the theory of composite surface emission as applied to electric arcs in an inert atmosphere. In these prior applications, methods of inert gas shielded consuming electrode metal arc welding with alternating current and direct current straight polarity are disclosed. It has now been found that the same basic theory can be applied to inert gas shielded metal arc cutting enabling this cutting process to be carried out by alternating current and direct current straight polarity. For a complete and detailed description of the principles involved in this advance in the art, reference should be made to my prior applications Serial Nos. 288,447 and 228,448. Briefly stated, it has been found that if a substance comprising a metal selected from the group consisting of the alkali metals, the alkaline earth metals, lanthanum and the lanthanum series rare earth metals, actinium and the actinium series rare earth metals, scandium, and yttrium is introduced to an electric arc in an atmosphere comprising substantially monatomic inert gas or a mixture of monatomic inert gases, such metal will form with the cold cathode base metal a composite emission surface having characteristic thermionic emission properties. The effect of this is that the alternating current arc can be maintained with a low open circuit voltage supply, the heat release at the cathode of the arc is greatly reduced and the transfer of metal from the electrode when the electrode is negative is changed from the mis-directed globular type transfer to the axial spray type transfer. It may readily be seen then, that these effects are exactly what is required to overcome the ills inherent in straight polarity direct current and alternating current gas shielded metal arc cutting. For alternating current cutting the addition of this material to the arc, which may be termed an emissive addition, acts to stabilize the arc and prevent arc extinction as the current passes through zero on each half cycle. The emissive addition further acts to improve the metal transfer characteristic on the straight polarity half of the welding current cycle, and thus avoids the difficulties accompanying the mis-directed globular type transfer which otherwise makes alternating current cutting unsatisfactory. For direct current straight polarity cutting the use of emissive additions prevents the arc instability, short circuiting, and workpiece contamination which comes from the poor metal transfer characteristics of the straight polarity arc. In addition, the use of the emissive agent reduces the heat at the cathode (wire) in an amount to reduce the wire burn-off rate to a value comparable with the reverse polarity wire burn-off rate.

The metals listed above which are effective as emissive additions can be added to the arc either in elemental or metallic form, or in the form of compounds thereof, which will either partially or wholly dissociate in the arc and liberate the said elements. For example, the oxides, carbonates, borates, phosphates, nitrates, silicates, or halides, of said elements can be used. Mixtures of two or more of said elements and/or compounds may be used and are often particularly effective. The alkali metals are lithium, sodium, potassium, rubidium, cesium and francium. The alkaline earth metals are calcium, barium, strontium and radium. Lanthanum series rare earths are cerium, praseodymium, neodymium, promethium, samarium, europium, gadolinium, terbium, dysprosium, holmium, erbium, thulium, ytterbium, lutecium. Actinium series rare earth metals are thorium, protactinium, uranium, neptunium, plutonium, americium, and curium.

Many of the elements and compounds thereof in the periodic groups listed immediately above are rare and expensive, and some are dangerously radioactive. Therefore, it is preferred both for practical reasons and also because particularly beneficial and highly desirable results may be obtained therefrom in the inert shielded metal arc cutting of the common structural metals to use an emission agent which is an element selected from the group consisting of potassium, rubidium, cesium, strontium, barium, lanthanum, and cerium.

Specific examples of presently preferred addition materials are cesium nitrate, rubidium carbonate, cesium-rubidium chloride, barium oxide or carbonate, barium-strontium mixtures in the form of oxides or carbonates, lanthanum and lanthanum series rare earth mixtures in metallic and oxide forms, and potassium carbonate.

In the preferred form of the invention the emissive additions are introduced to the arc in the form of a superficial addition to the surface of the electrode wire. Such an addition may be applied in the manner described in detail in my co-pending applications Serial Nos. 288,447 and 288,448. The emissive addition may of course be made in other ways.

While it is generally preferred to use substantially pure inert gases only, it is to be understood that the addition of minor amounts of active gases to the inert gas is also contemplated.

It will be evident that as a result of this invention it has been made possible to cut metals with the inert gas shielded arc cutting process using an alternating current power supply or a direct current power supply operated at straight polarity. It is to be understood that the invention is not limited to the particular form described but may be used in other ways without departing from its spirit as defined by the following claims.

I claim:

1. A method of cutting metal which comprises forming an arc between a consuming wire electrode and a workpiece to be cut, increasing the electron emissivity of said wire electrode by supplying to said arc a substance comprising a metal selected from the group consisting of the alkali metals, the alkaline earth metals, lanthanum and the lanthanum series rare earth metals, actinium and the actinium series rare earth metals, scandium, and yttrium, supplying current through said wire electrode to said arc with said electrode at least part of the time at negative polarity relative to the workpiece and with said current at a strength sufficient both to penetrate said workpiece and form a kerf therein as said electrode is moved laterally with respect to said workpiece and to project molten metal axially from the end of said electrode freely beyond the walls of said kerf, feeding the electrode wire to said arc at a rate such that an arcing portion of said electrode is maintained within said kerf, and shielding the end of said wire electrode, the arc, and the portion of the workpiece being cut with a flowing stream of inert gas.

2. A method of cutting metal according to claim 1 in which the arc current is alternating current.

3. A method of cutting metal according to claim 1 in which the arc current is direct current straight polarity.

4. A method of cutting metal according to claim 1 in which the workpiece is a non-ferrous material and the electrode wire is a ferrous material.

5. A method of cutting metal according to claim 1 in which the substance supplied to said arc is supplied in the form of a superficial addition to the surface of the wire electrode.

(References on following page)

References Cited in the file of this patent

UNITED STATES PATENTS

| | | |
|---|---|---|
| 1,294,250 | Elliott | Feb. 11, 1919 |
| 1,501,266 | Brace | July 15, 1924 |
| 1,884,712 | Jerabek | Oct. 25, 1932 |
| 2,315,358 | Smith | Mar. 30, 1943 |
| 2,544,711 | Mikhalapov | Mar. 13, 1951 |
| 2,694,763 | Muller | Nov. 16, 1954 |
| 2,694,764 | Muller | Nov. 16, 1954 |

FOREIGN PATENTS

| | | |
|---|---|---|
| 546,961 | Great Britain | Aug. 7, 1942 |

OTHER REFERENCES

Electric Arc Cutting of Aluminum, in "Welding and Metal Fabrication," March 1953, pages 88–91; published by L. Cassier Co., London.

Use of Gas-Shielded Arc Processes for Cutting Nonferrous Metal, in "Welding and Metal Fabrication," May 1954, pages 188–191, published by L. Cassier Co., London.